(12) United States Patent
Zagayevskiy et al.

(10) Patent No.: US 12,410,689 B2
(45) Date of Patent: *Sep. 9, 2025

(54) FLOW SIMULATOR FOR GENERATING RESERVOIR MANAGEMENT WORKFLOWS AND FORECASTS BASED ON ANALYSIS OF HIGH-DIMENSIONAL PARAMETER DATA SPACE

(71) Applicant: Landmark Graphics Corporation, Houston, TX (US)

(72) Inventors: Yevgeniy Zagayevskiy, Houston, TX (US); Shohreh Amini, Houston, TX (US); Srinath Madasu, Houston, TX (US); Zhi Chai, Houston, TX (US); Azor Nwachukwu, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 344 days.

This patent is subject to a terminal disclaimer.

(21) Appl. No.: 17/014,331

(22) Filed: Sep. 8, 2020

(65) Prior Publication Data

US 2021/0133375 A1 May 6, 2021

Related U.S. Application Data

(60) Provisional application No. 62/929,027, filed on Oct. 31, 2019.

(51) Int. Cl.
*E21B 43/00* (2006.01)
*E21B 21/08* (2006.01)
(Continued)

(52) U.S. Cl.
CPC .............. *E21B 43/00* (2013.01); *E21B 21/08* (2013.01); *E21B 47/003* (2020.05); *G01V 20/00* (2024.01);
(Continued)

(58) Field of Classification Search
CPC ........ E21B 43/00; E21B 21/08; E21B 47/003; E21B 2200/20; E21B 41/0092;
(Continued)

(56) References Cited

U.S. PATENT DOCUMENTS

| 7,054,752 B2 | 5/2006 | Zabalza-Mezghani et al. |
| 8,335,677 B2 | 12/2012 | Yeten et al. |

(Continued)

FOREIGN PATENT DOCUMENTS

| JP | 2004062440 | 2/2004 |
| JP | 2011242923 | 12/2011 |

(Continued)

OTHER PUBLICATIONS

Kassenov et al. ("Efficient Workflow for Assisted History Matching and Brownfield Design of Experiments for the Tengiz Field", 2014) (Year: 2014).*

(Continued)

*Primary Examiner* — Rehana Perveen
*Assistant Examiner* — Troy A Maust
(74) *Attorney, Agent, or Firm* — DeLizio, Peacock, Lewin & Guerra, LLP

(57) ABSTRACT

An apparatus used to generate forecasts from a high-dimensional parameter data space. The apparatus comprising a reservoir model and a flow simulator module. The reservoir model comprising a plurality input variables, output variables, and at least one algorithmic model. The input variables and output variables are generated by the flow simulator module and variables from a formation and reservoir properties database and a field production database. The flow simulator module generates the at least one algorithmic model and the output variables using at least one selected from a group comprising a full-physics flow simulator, proxy flow simulator for assisted history matching, and a
(Continued)

proxy flow simulator for field development optimization. The full-physics flow simulator and the two proxy flow simulators generate the at least one algorithmic model using at least one selected from a group comprising the reservoir model, history matching input variables, and optimization input variables.

18 Claims, 9 Drawing Sheets

(51) Int. Cl.
| | |
|---|---|
| *E21B 47/003* | (2012.01) |
| *G01V 20/00* | (2024.01) |
| *G06F 18/20* | (2023.01) |
| *G06F 30/27* | (2020.01) |
| *G06F 113/08* | (2020.01) |

(52) U.S. Cl.
CPC ............. *G06F 18/29* (2023.01); *G06F 30/27* (2020.01); *E21B 2200/20* (2020.05); *G01V 2210/665* (2013.01); *G06F 2113/08* (2020.01)

(58) Field of Classification Search
CPC ...... E21B 21/00; E21B 21/082; E21B 21/085; E21B 33/00; G01V 99/005; G01V 2210/665; G06F 18/29; G06F 30/27; G06F 2113/08; G06F 30/28; G06F 30/20
See application file for complete search history.

(56) References Cited

U.S. PATENT DOCUMENTS

| | | | |
|---|---|---|---|
| 9,151,868 | B2 | 10/2015 | Levitan |
| 2003/0015351 | A1 | 1/2003 | Goldman et al. |
| 2008/0133194 | A1 | 6/2008 | Klumpen et al. |
| 2010/0155142 | A1 | 6/2010 | Thambynayagam et al. |
| 2012/0123746 | A1* | 5/2012 | Postma .................. G06F 17/13 703/2 |
| 2012/0253770 | A1 | 10/2012 | Stern et al. |
| 2013/0246032 | A1 | 9/2013 | El-Bakry et al. |
| 2013/0338985 | A1 | 12/2013 | Garcia et al. |
| 2014/0039859 | A1 | 2/2014 | Marko et al. |
| 2015/0153476 | A1 | 6/2015 | Prange et al. |
| 2016/0055125 | A1* | 2/2016 | Razavi ................... G06F 30/20 703/2 |
| 2016/0356125 | A1 | 12/2016 | Bello et al. |
| 2018/0210977 | A1 | 7/2018 | Baddourah et al. |
| 2022/0245300 | A1* | 8/2022 | Bordas ................ G01V 99/005 |

FOREIGN PATENT DOCUMENTS

| | | |
|---|---|---|
| JP | 2019179319 | 10/2019 |
| KR | 100566438 | 3/2006 |

OTHER PUBLICATIONS

Patel et al. ("Polynomial-Chaos-Expansion Based Integrated Dynamic Modelling Workflow for Computationally Efficient Reservoir Characterization: A Field Case Study", 2017) (Year: 2017).*

Bhark et al. ("Assisted History Matching Benchmarking: Design of Experiments-based Techniques", 2014) (Year: 2014).*

Boxiao Li, et al.; "Best Practices of Assisted History Matching Using Design of Experiments"; SPE Journal; Aug. 2019; pp. 1435-1451.

T.E. Esmaiel, et al.; "Reservoir Screening and Sensitivity Analysis of Waterflooding with Smart Wells through the Application of Experimental Design"; SPE International—SPE 93568; 2005; p. 1-8.

International Search Report and Written Opinion issued in corresponding International Patent Application No. PCT/US2020/050477; mailed on Dec. 23, 2020.

International Search Report and Written Opinion issued in related International Patent Application No. PCT/US2020/050478; mailed on Jan. 6, 2021.

Office Action and Search Report mailed Oct. 13, 2023 for NO Application No. 20220282.

Office Action mailed Apr. 17, 2024 for Norwegian Patent Application No. 20220282.

* cited by examiner

FLOW SIMULATOR FOR GENERATING RESERVOIR MANAGEMENT WORKFLOWS AND FORECASTS BASED ON ANALYSIS OF HIGH-DIMENSIONAL PARAMETER DATA SPACE

CROSS-REFERENCE TO RELATED APPLICATIONS

This application claims the benefit of U.S. Provisional Application No. 62/929,027 filed on Oct. 31, 2019, the entire disclosure of which is expressly incorporated herein by reference.

BACKGROUND

Predictive analysis of big data based on complex workflows, i.e. algorithmic models, are computationally expensive and time consuming. However, although less computationally expensive and time consuming, less complex workflows produce less accurate forecasts, i.e. predictions. Therefore, in order to allow reservoir management teams to quickly make informed and effective decisions, there is a need for systems that can generate less computationally complex workflows yet still maintain an acceptable degree of accuracy.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1:
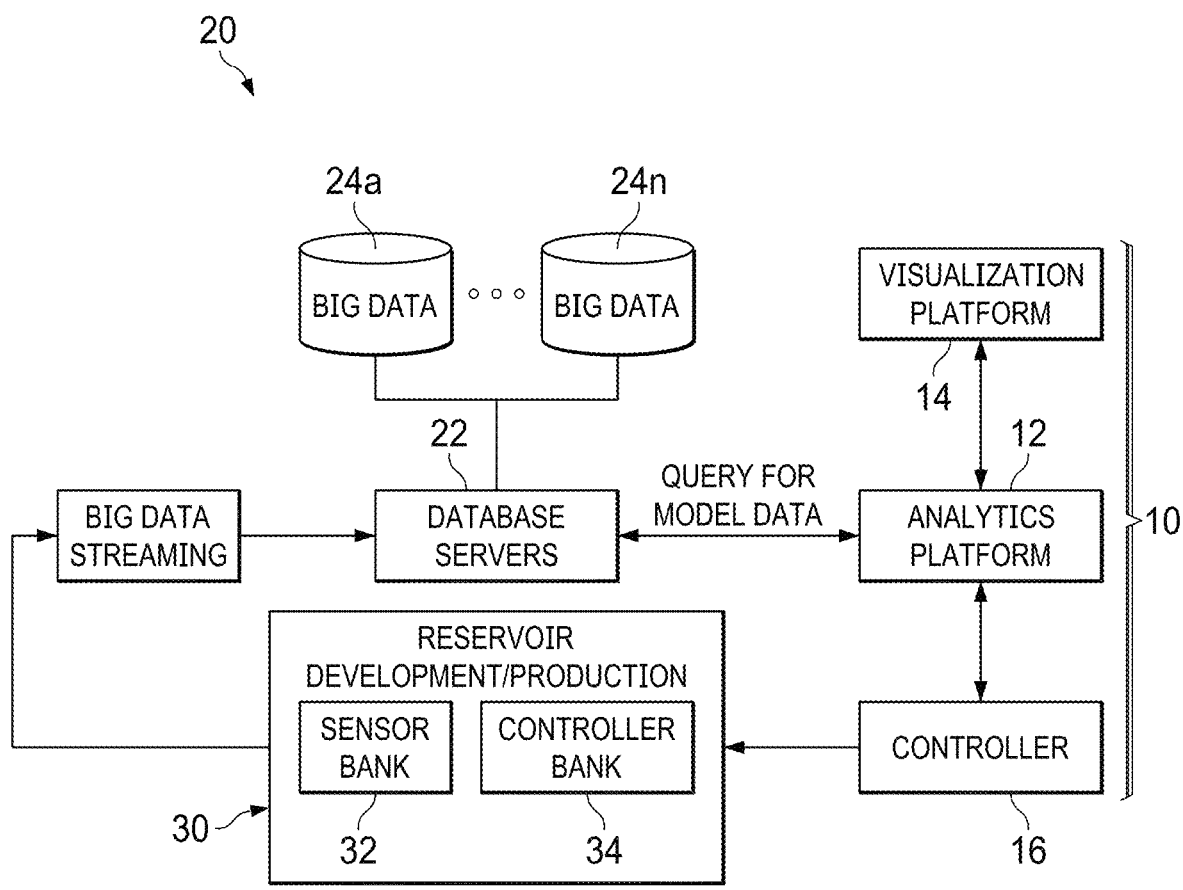
FIG. 1 is an illustration of a diagram of a system comprising a predictive analytics tool, big data repository, and a reservoir development and/or production facility for managing reservoir development and/or production using workflows and forecasts, in accordance with certain example embodiments.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

Traditional hydrocarbon reservoir workflows used to generate reservoir characterization data models are usually generated using high dimensional parameter space data models and full physics algorithmic model or models. This method of generating data models requires a significant amount of computational resources and computational time during reservoir simulation. As such, decision making and planning in the reservoir management process can be delayed. This delay can introduce unwanted expenses and costs for well site developers and operators.

Presented herein is a system, method, and apparatus that uses machine learning methods and, optionally, model-order reduction techniques, history matching techniques, and optimization techniques to produce more efficient workflows that are less computationally expensive, computationally time consuming, yet produce accurate, reliable forecasts that provides for more informed decision making for the management of hydrocarbon reservoir development and production. Computational processing time and complexity can be reduced through proxy flow modeling. Algorithmic models having a reduced parameter size are generated based on statistical and machine learning (deep neural network) approximation of a full physics flow simulator, i.e. the processing of a full physics flow algorithmic model. Model order reduction techniques can be applied to the proxy flow model generated algorithmic models to further reduce a number of its parameters. History matching and optimization algorithms have faster convergence rate when they operate on fewer parameters. Therefore, model order reduction allows reducing computational time even more. Sensitivity analysis or design of experiments can also be used to identify optimal variables for certain reservoir management operation scenarios. The system, method, and apparatus can be executed in cloud using high performance processing units, e.g. GPU (Graphics Processing Unit) and multicore processing environment, can further reduces computational time.

In this specification, workflow means an algorithmic model or models and an associated data model or models. Geological data model means a high-dimensional parameter data space of reservoir properties, i.e. permeability and porosity. Big data means a high-dimensional parameter data space, e.g. millions of rows and/or columns of variables. Machine learning algorithms can mean, as an example, simple multivariate regression model (MVR), artificial neural network (ANN), and a decision tree-based algorithm named extreme gradient boosting (XGB). These algorithms are compared for construction of a proxy model. Optimization algorithm can mean, as an example, particle swarm optimization (PSO), genetic algorithm (GA), and a hybrid approach of PSO and GA, called genetical swarm optimization (GSO). Uncertainty variables are related to the uncertainty quantification and the science of quantitative characterization. Output variables, predicted variable, forecast variables are used interchangeable within this specification. Reduced parameter space means the number of parameters associated with an algorithmic model and input variables have a reduced number of parameters compared with an original algorithm model, or a previously generated algorithmic model, and input variables associated with the algorithmic model, or the previously generated algorithm model.

Referring now to FIG. 1, illustrated is a diagram of a system comprising a predictive analytics tool 10, big data repository 20, and a reservoir development and/or production facility 30 for managing reservoir development and/or production using workflows and forecasts, according to certain example embodiments. The analytics tool 10 comprises an integrated closed-loop analytics platform 12, a visualization platform 14, and a controller 16. The integrated closed-loop analytics platform 12 is communicable coupled with the big data repository 20, the visualization platform 14, and the reservoir production and/or development facility 30 through the controller 16. The big data repository 20 comprises database servers 22 and storage banks 24a-24n for receiving high velocity, high volume streaming data or data otherwise communicated periodically from the reservoir development and/or production facility 30. The reservoir development and/or production facility 30 comprises a sensor bank 32 and a controller bank 34. The sensor bank 32 is communicable coupled to the database base servers 22 and can stream data from the facility 30 or load the data periodically. The controller bank 34 is communicable coupled with the controller 16. Based on data models queried from the big data repository 20, generated algorithmic models, and other relevant information, forecasts, i.e. predictions, the integrated closed-loop analytics platform 12 can generate visualizations and/or generate control signals to control the controller bank 34 through the controller 16.

Figure 2A:
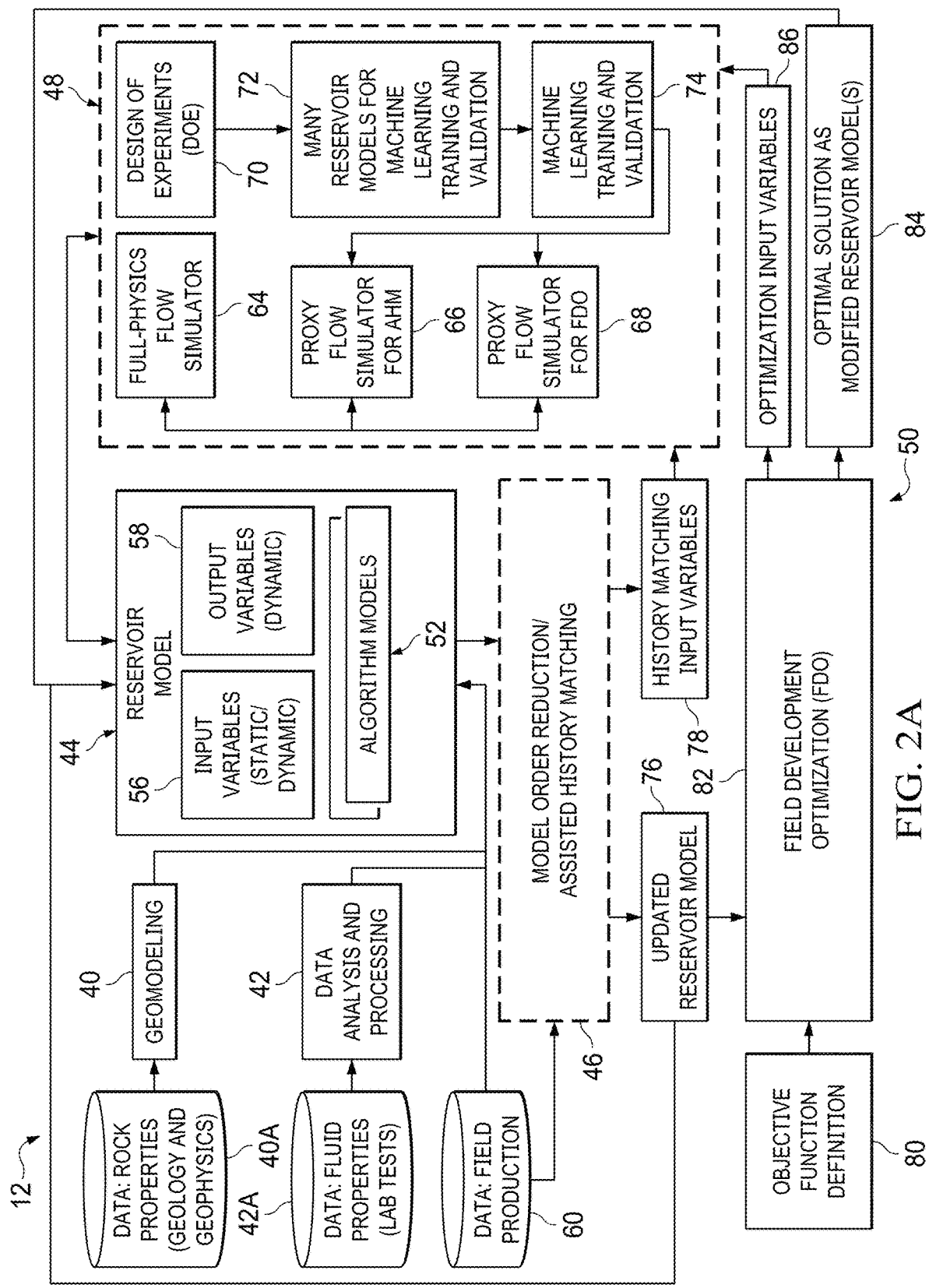
FIG. 2A is an illustration of a diagram of the integrated closed-loop analytics platform 12 that defines and generates algorithmic models used to create reservoir data models and forecasts from a high-dimensional parameter data space, in accordance with certain example embodiments.

Referring now to FIG. 2A, illustrated is a diagram of the integrated closed-loop analytics platform 12 that defines and generates algorithmic models used to create reservoir data models and forecasts from a high-dimensional parameter data space, according to certain example embodiments. The analytics platform 12 comprises a geomodeling module 40, a data analysis module 42, a reservoir model 44, a model order reduction/assisted history matching module 46, a flow simulator module 48, and an optimization module 50. The analytics platform 12 can use a proxy flow simulator, trained algorithmic models, model order reduction techniques, assisted history matching techniques, and an optimization process to supplement a full-physics flow simulator to generate algorithmic models that are less computationally complex and, therefore, more efficient. These algorithmic models can be used against a high-dimensional parameter data space, commonly referred to as Big Data, to generate reservoir data models with predictive results.

The geomodeling module 40 generates static input variables from geology and geophysics database 40A. The static input variables can include geological data, such as formation structure derived from geophysical interpretations, and petrophysical rock properties, such as lithological facies, porosity, and absolute permeability attributes for a particular earth formation and hydrocarbon reservoir. The data analysis module 42 also generates static input variables from lab tests database 42A. The static input variables can include fluid and rock property variables from lab measurements based on a fluid and rock type or types. Stated differently, the static input variables are geological data and petrophysical data produced on different types of rocks and fluids. The variables describe physical properties of the fluid and rock, such as compressibility, relative permeability, thermodynamic interaction, and more.

The reservoir model 44 can comprise algorithmic models 52, a data pool of variables, and, optionally, a 3-Dimensional (3D) representation of the geological structure and petrophysical properties of a corresponding earth formation and hydrocarbon reservoir using the data pool of variables. The algorithmic models 52 and data pool of variables evolve over an iterative computation process based on predefined criteria. The algorithmic models 52 comprise different models having different degrees of complexity. The algorithmic models 52 are produced over the processing cycles of the analytics platform 12 and include an algorithmic model that satisfies a user's predefined criteria. The data pool of variables comprises input variables 56 from the geomodeling module 40, the data analysis module 42, and a field production database 60. The input variables 56 can be static and/or dynamic. The geological properties are assumed static whereas the field production and geophysical data from the field production and geophysics database 60 may be dynamic and/or static. The data pool of variables also comprises dynamic output variables 58 generated by the flow simulator module 48, the model order reduction/assisted history matching module 46, and the optimization module 50 based on the input variables 56 and previously processed output variables 58. The dynamic output variables 58 are predicted, i.e. forecasted, variable values, such as pressure and fluid (oil, water, gas) saturation on a grid or fluid production rates at the well locations. Initially, the input variables 56 can be considered of a large size, wherein the plurality of input variables 56 can comprise millions of rows and/or columns of data, and the algorithmic model has a high order of parameters. However, the number of input variables 56 and number of algorithmic parameters are reduced through iterative processing using the model order reduction/assisted history matching module 46. The predefined criteria can be based on an optimal solution, an amount of processing time, a final algorithmic model having a given parameter size, or an acceptable algorithmic model accuracy.

It should be understood that the term static and dynamic used to describe input variables 56 and output variables 58 are in relation to time as it relates to Earth formation and reservoir properties. However, as just stated, the number of variables can change and in some cases the values of some variables may change due to approximation of calculations and other functions performed by some features of the analytics platform 12. It should also be understood that the reservoir model 44 can be generated and optimized efficiently and effectively using the flow simulator module 48, the model order reduction/assisted history matching module 46, and the optimization module 50. However, a user can select which features or sub features of the flow simulator 48, the model order reduction/assisted history matching module 46, and the optimization module 50 are used to generate the reservoir model 44.

Figure 2B:
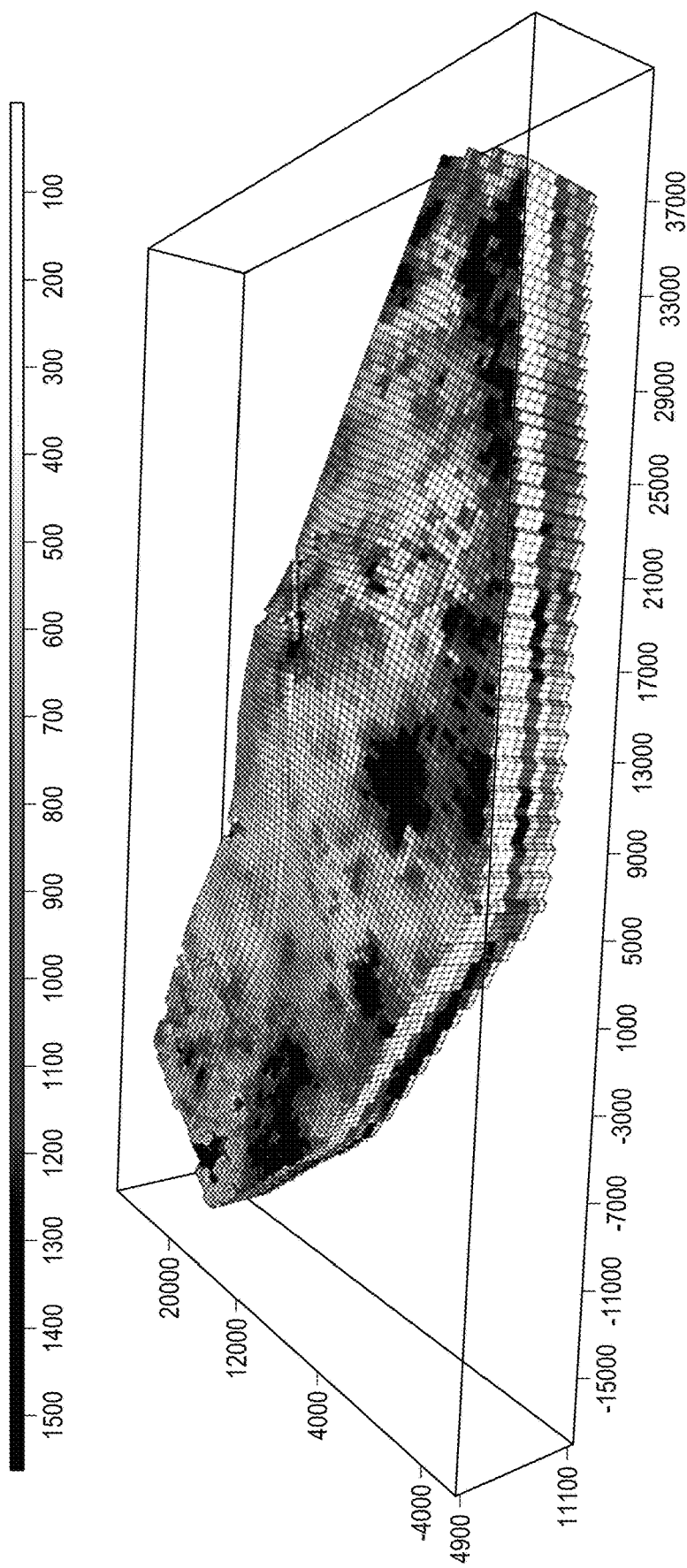
FIG. 2B, illustrated is an example of a 3D representation of a geological structure and petrophysical properties.

The 3D representation can be generated to include a grid. Geostatistical techniques can be used to populate the grid using the variables describing the geological and petrophysical rock properties with correct spatial continuity. Grid block or blocks can be populated using the variables describing the fluid and rock properties generated from lab tests. The grid can also be populated with data from the field production database 60, such as operating bottomhole pressure or injection water rate. This data is also considered as input variables to the flow simulator module 48. FIG. 2B is an example of a 3D representation of a geological structure and petrophysical properties. In addition, the user can interact with the 3D representation to change certain variables, e.g., change the size of the modeled Earth formation, the field production variables, and/or the predicted variables. Using the flow simulator module 48, the model order reduction/assisted history matching module 46, and the optimization module 50 regeneration of the 3D representation is also efficient and effective.

The flow simulator module 48 can comprise a full-physics flow simulator 64, such as Nexus® software from Halliburton Landmark, proxy flow simulator for assisted history matching 66, proxy flow simulator for field development optimization 68, a design of experiments module 70, a plurality of reservoir data models for machine learning training and validation 72, and a machine learning and training, validation and testing module 74. The model order reduction/assisted history matching module 46 generates a reduced list of history matching input variables 78 of the reservoir model and an updated reservoir model 76 having a reduced parameter space. The reduced list of history matching input variables 78 is a list of input variables 56 wherein that list of variables has a reduced parameter space than that of input variables 56 initially fed into the module 46. The model order reduction feature of module 46 uses a function decomposition or design of experiments algorithm to reduce the parameter space of the reservoir model 44 by identifying input variables 56 that can be used to best approximate the output variables 58. In other words, the number of input variables 56, as determined by the flow simulator module 48, used by the algorithmic model to determine output variables 58 is reduced using the function decomposition or design of experiments algorithm to identify best approximations. The history matching feature of module 46 uses optimization techniques to update reservoir model 44 with dynamic field production data 60 by reducing the mismatch between reservoir model predictions and observed production data 60. The optimization module 50 comprises an objective function definition module 80 and a field development optimization module 82 and generates an optimized reservoir model 84 to identify best field development scenario and optimization input variables 86 to construct a proxy flow model for the optimization module 50.

It should be understood by those of skill in the art that the analytics platform 12 is a looped computational system that continuously process the reservoir model 44 until the predefined criteria is satisfied. Furthermore, it should also be understood the user may elect not to include all features or sub-features of the analytics platform 12. As an example, a user may choose not to use the model order reduction/assisted history matching module 46. In which case, output from the reservoir model 44 would be connected directly to the optimization module 50 and use of the proxy flow simulator for assisted history matching 66 would not be required. The user may choose to only use the assisted history matching feature of module 46. In which case, the optimization module 50 and proxy flow simulator for field development optimization module 68 would not be needed. Obviously, a user may choose not to use the optimization module 50. In this event, the proxy flow simulator for field development optimization 68 would not be needed. Another example could be that a user does not require or want the use of the proxy flow simulators 66, 68 and would rather rely upon the full-physics flow simulator 64, the model order reduction/assisted history matching module 46, and the optimization module 50 to generate the reservoir model 44.

In practice, initially a computationally complex algorithmic model is generated using the full-physics flow simulator 64. Using this algorithmic model to generate the output variables 58 based on the input variables 56 can be very time consuming and resource intensive. The proxy flow simulator for assisted history matching 66 and/or proxy flow simulator for field development optimization 68 can be used to significantly reduce the complexity of the computationally complex algorithmic model by reducing the algorithms parameter space and approximating the underlying algorithms for fluid flow prediction and, therefore, generate the output variables 58 of the reservoir module 44 using less computational resources and in a more efficient manner with acceptable accuracy. The proxy flow simulator for assisted history matching 66 generates less computationally complex algorithmic models using variables from the model order reduction/assisted history matching module 46, trained algorithmic models, and the more complex algorithmic model generated by the full-physics flow simulator. The proxy flow simulator for field development optimization 68 generates less computationally complex algorithmic models using variables from the optimization module 50, trained algorithmic models, and the more complex algorithmic model generated by the full-physics flow simulator. It should be understood that the generated algorithmic models 52 may include models that are generated by the proxy flow simulator for assisted history matching 66, proxy flow simulator for field development optimization 68, and both 66 and 68. Stated differently, model or models of algorithmic models 52 may be a product of only the proxy flow simulator for assisted history matching 66 or proxy flow simulator for field development optimization 68, or a product of both.

A plurality of reservoir data models 72 can be used by the machine learning and training validation module 74 to train and validate a less computationally complex algorithmic model using the computationally complex algorithmic model. The plurality of reservoir data models 72 is previously generated data models generated by the full-physics flow simulator 64. The machine learning and training and validation module 74 can iteratively generate reduced parameter space algorithmic models from the computationally complex algorithmic model using at least one training dataset and at least one validation dataset, i.e. reservoir models, and at least one selected from a group of: input variables 56, output variables 58, updated reservoir model 76, history matching input variables 78, the optimized reservoir model 84, and optimization input variables 86. Stated slightly differently, the machine learning and training and validation module 74 can use supervised learning methods, such as multivariate regression, artificial neural network, extreme gradient boosting, and others, to fit the computationally complex algorithmic model with a reduced parameter space algorithmic model using the training datasets and at least one selected from a group comprising: input variables 56, output variables 58, updated reservoir model 76, history matching input variables 78, the optimized reservoir model 84, and optimization input variables 86. In essence, output variables (predicted results) 58 are generated using the fitted model and compared against output variables 58 generated using the computationally complex algorithmic model to find a simplified algorithmic model. The machine learning and training validation module 74 can then validate the accuracy of the reduced parameter space algorithmic model by generating predictive results using the fitted model against a validation dataset or datasets and comparing the predictive results against an answer key. The flow simulator module 48 can continue this process until the predefined criteria is satisfied. The algorithmic model for the proxy flow simulator for assisted history matching 66 is trained using the aforementioned test datasets and validation datasets and the history matching input variables 78. The algorithmic model for the proxy flow simulator for field development optimization 82 is also trained using the aforementioned test datasets and validation datasets and the optimal input variables 86.

The flow simulator module 48 can also include the design of experiments module 70. The design of experiments module 70 is used to generate a training and validation datasets 72. The values of the input variables 56, 78, 86 are varied in the design of experiments module 70 in order to generate values of output variables 58. These set of values of input and output variables determine training and validation datasets.

The assisted history matching feature of the model order reduction/assisted history matching module 46 calibrates the reservoir model 44 using field production data, such as oil, water, and gas production rates, from the field production database 60. In the model order reduction feature of the module 46, uncertainty input parameters are defined by a process called model order reduction; where a large number of gridded reservoir parameters, such as porosity or permeability, distributed on the grid are represented by a smaller number of coefficients. These coefficients are defined as uncertainty input parameters, which are derived by applying a series expansion algorithm, such as Karhunen-Loève expansion. Screened uncertainty input parameters are defined from the uncertainty input parameters by a process called sensitivity analysis. Sensitivity analysis changes the values of the uncertainty input parameters to identify dependencies with select output variables 58. The uncertainty input parameters and values or those with a select amount of dependency are the history matching input variables 78. In the assisted history matching feature of the module 46, the uncertainty input parameters and values or the select amount of parameters and values having a threshold of dependency are further adjusted to account for differences between predicted and measured values of certain output variables 58, e.g. predicted well production rates, and actual well production rates from the field are minimized using an optimization algorithm, for example Bayesian optimization.

The field development optimization module 82 is used to define a best case scenario or scenarios to operate a well development and production site by finding optimal operation settings and/or by defining optimal locations for new well placement. This procedure for finding optimal reservoir management scenarios is solved with an optimization technique, such as particle swarm optimization or genetic algorithm. The objective function definition module 80 defines a particular objection function or functions. The function or functions provide an analytical form for optimality of the optimization problem, such as net present value (NPV) of a hydrocarbon reservoir project. Different scenarios can be generated by varying values of the optimization input parameters that are different from the uncertainty input parameters. An example of the optimization input parameters is oil and gas production rate at the production well, water injection rate at the injection well, locations of the wells, locations of the valves, and so on; in other words, the parameters of the reservoir equipment settings, values of which can be changed by a human operator manually or automatically. The optimal solution is represented by one or several modified reservoir models 84.

Society of Petroleum Engineers (SPE) 93568, "Reservoir Screening and Sensitivity Analysis of Waterflooding With Smart Wells Through the Application of Experimental Design", T. E. H. Esmaiel, Delft U. of Technology, Kuwait Inst. For Scientific Research; S. Fallah, Delft U. of Technology, Natl. Iranian Oil Co.; and C. P. J. W. van Kruijsdijk, Delft U. of Technology, Copyright © 2005, Society of Petroleum Engineers Inc., is an example of white paper that discusses the use of experimental design methods to find an optimal proxy model in a more computationally efficient manner. "Best Practices of Assisted History Matching Using Design of Experiments," Boxiao Li, Chevron Energy Technology Company; Eric W. Bhark, Chevron Asia Pacific E&P Company; and Stephen J. Gross (ret.), Travis C. Billiter, and Kaveh Dehghani, Chevron Energy Technology Company, August 2019 SPE Journal, Copyright © 2019 Society of Petroleum Engineers, is another white paper that discusses the use of experimental design methods and assisted history matching to find an optimal proxy model in a more computationally efficient manner.

Figure 3:
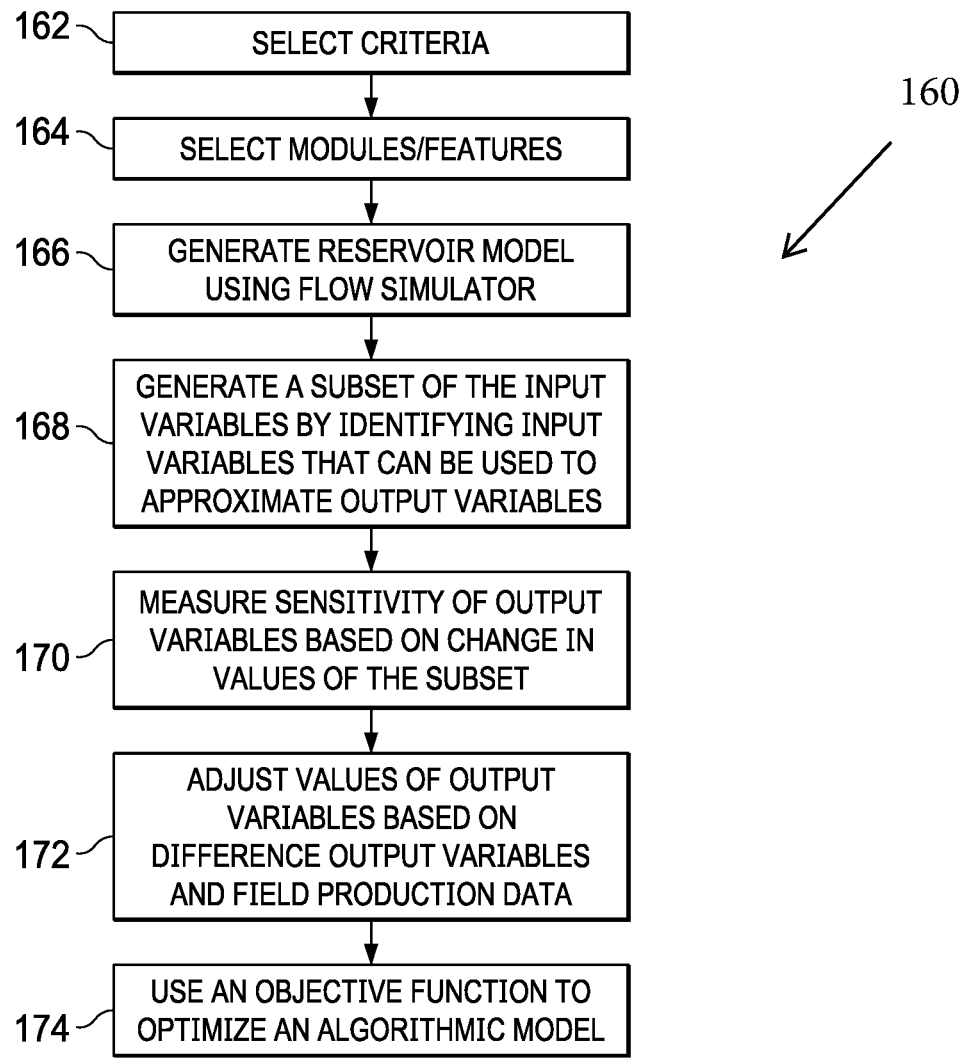
FIG. 3 is an illustration of a diagram of an algorithm for a proxy flow simulator of the integrated closed-loop analytics platform for generating reservoir management workflows and forecasts from a high-dimensional parameter data space, in accordance with certain example embodiments.

Referring now to FIG. 3, illustrated is a diagram of an algorithm 160 for the flow simulator module 48 of the analytics platform 12 for generating reservoir management workflows and forecasts from a high-dimensional parameter data space, according to example embodiments. The algorithm 160 generates output variables 58 using algorithmic models 52 generated using selected modules and features of the flow simulator module 48, model order reduction/assisted history matching module 46, and field development optimization module 50. The algorithmic models 52 are generated until a predefined criteria is satisfied. The last model generated is capable of generating a data model with predictive variables (the output variables 58) using the input variables 56 or a subset of the input variables 56 in a computationally efficient manner. As previously stated, the predefined criteria can be based on an optimal solution, an amount of processing time, a final algorithmic model having a given parameter size, or an acceptable algorithmic model accuracy.

The algorithm 160 begins at block 162 where a criteria (objective/goal) for generating an algorithmic model 162 is selected. For example, an optimal field development scenario can be identified for a petroleum reservoir under study. At block 164, the algorithm 160 selects the modules 46, 48, and 50 used in generating the algorithmic models 52 and the features, e.g. full-physics flow simulator 64, proxy flow simulator for assisted history matching 66, proxy flow simulator for field development optimization 68, etc. At block 166, the algorithm 160 generates the reservoir model 44. Initially, the reservoir model 44 only includes the input variables 56. The input variables 56 are a product of the geomodeling module 40, the data analysis module 42, and field production database 60. A subset of the input variables 56 such as petrophysical properties of the petroleum reservoir can be generated by applying geostatistical techniques, such as kriging interpolation technique or Sequential Gaussian Simulation (SGS), to well data. Other algorithms are used jointly with structural data, and seismic data, or a combination of those to generate other static properties of the reservoir such as reservoir model grid definition. Stated differently, the input variables can be conditioned to subsurface logging tool input data and/or geological survey data, such as well data, structural data, and seismic data, or a combination of those. The values of input variables 56 are generated to represent the uncertainty and variability in the model parameters. The input variables 56 can include porosity variables and permeability variables, as an example. After the input variables 56 are generated, an initial algorithmic model is generated using the full-physics flow simulator 64.

At block 168, the algorithm 160 generates trained algorithmic models, continuously, using the initial algorithmic model and the features selected until the criteria is satisfied. However, as previously stated, a user may elect to run only the full-physics flow simulator 64 along with the model order reduction/assisted history matching module 46 and/or the optimization module 50. In which case, the algorithm 160 moves to block 170 where the reservoir model 52 is continuously updated with output variables 56 and algorithmic models 52 until the criteria is satisfied. If the feature selected do require the use of trained algorithmic models, the algorithm 160 generates the trained algorithmic models using the initial algorithmic model and various feature of the analytics platform 12. As an example, the algorithmic models can be trained using the initial algorithmic model, a plurality of training and validation datasets, and the reservoir model 44 and any updates thereto that are realized during the processing cycle. As another example, design of experiments can be used to reduce the amount of time required to generate the trained algorithmic models. In yet another example, the algorithmic models can be trained using the initial algorithmic model, a plurality of training and validation datasets, the reservoir model 44 and any updates thereto that are realized during the processing cycle, and history matching input variables 78. In still yet another example, the algorithmic models can be trained using the initial algorithmic model, a plurality of training and validation datasets, the reservoir model 44 and any updates thereto that are realized during the processing cycle, and optimal input variables 86. In yet another example, the algorithmic models can be trained using the initial algorithmic model, a plurality of training and validation datasets, the reservoir model 44 and any updates thereto that are realized during the processing cycle, history matching input variables 78, and the optimization input variables 86. It should be understood that the trained algorithmic models are the same as algorithmic models 52.

Machine learning algorithms, such as multivariate regression model (MVR), artificial neural network (ANN), or a decision tree-based algorithm, or any combination thereof, can be used to generated the training and validation datasets and the trained algorithmic models. The decision tree-based algorithm can be an extreme gradient boosting (XGB) algorithm. With each algorithmic model generated, the reservoir model 44 can be updated, block 170, until the criteria is satisfied.

Figure 4A:
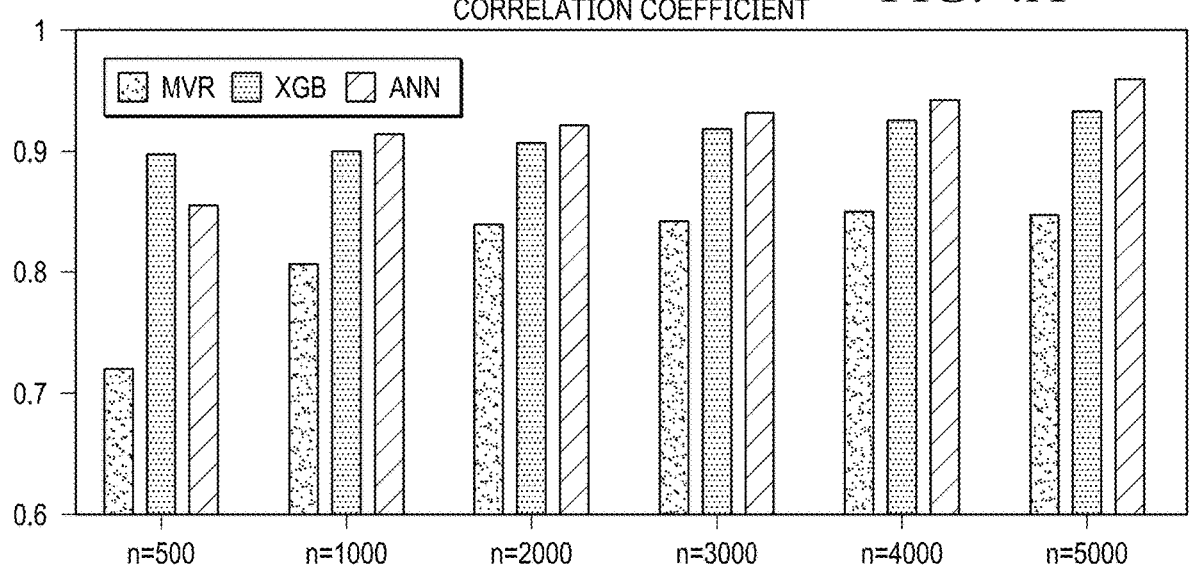
FIGS. 4A-4B are illustrations of a graph comparing the algorithmic proxy model performance with different machine learning algorithms.
Figure 4B:
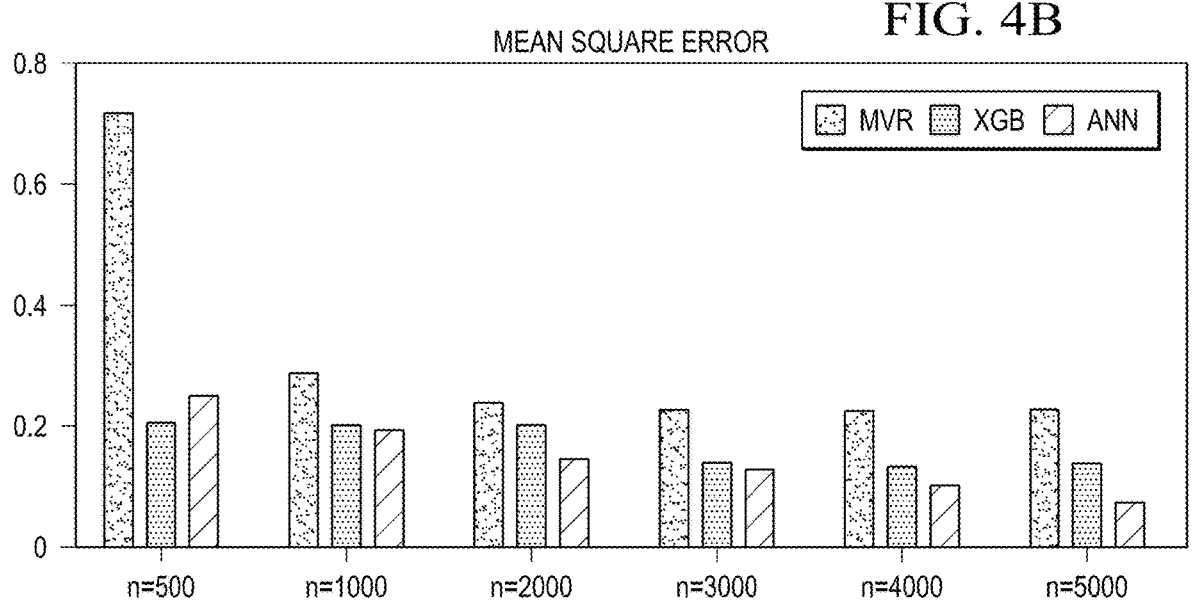
Figure 5A:
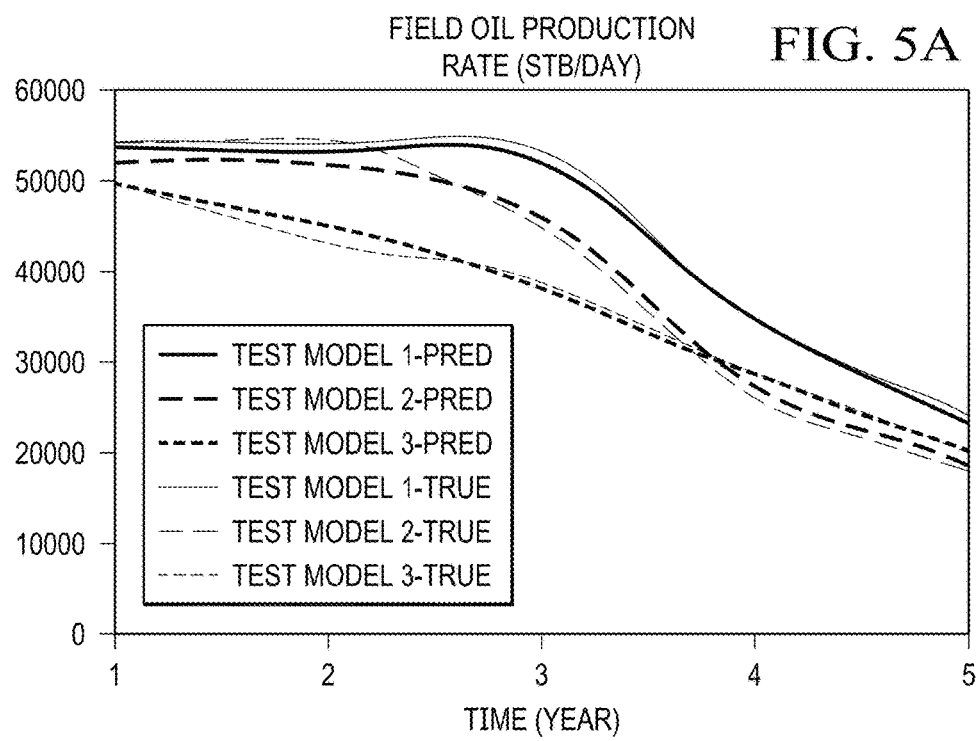
FIGS. 5A-5D are illustrations of a plot diagram of predicted production curves generated using the algorithmic proxy model and a machine learning algorithm versus actual production curves from simulation of a full physics flow model.
Figure 5B:
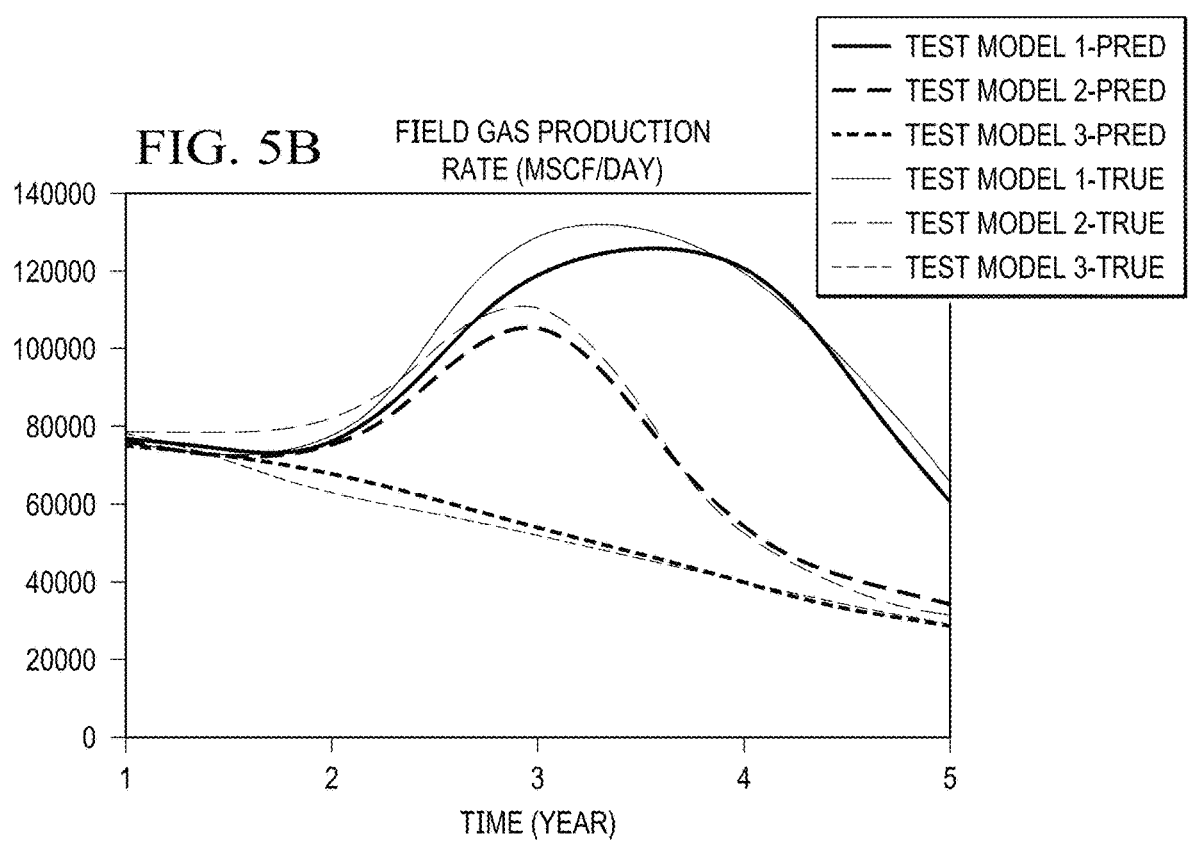
Figure 5C:
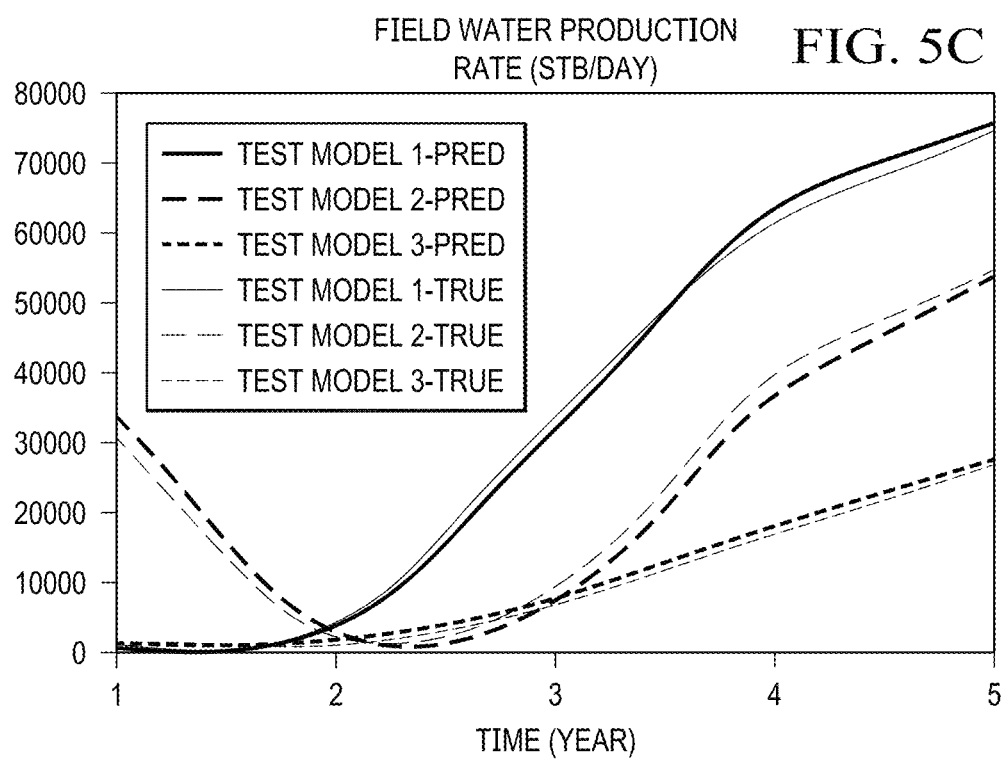
Figure 5D:
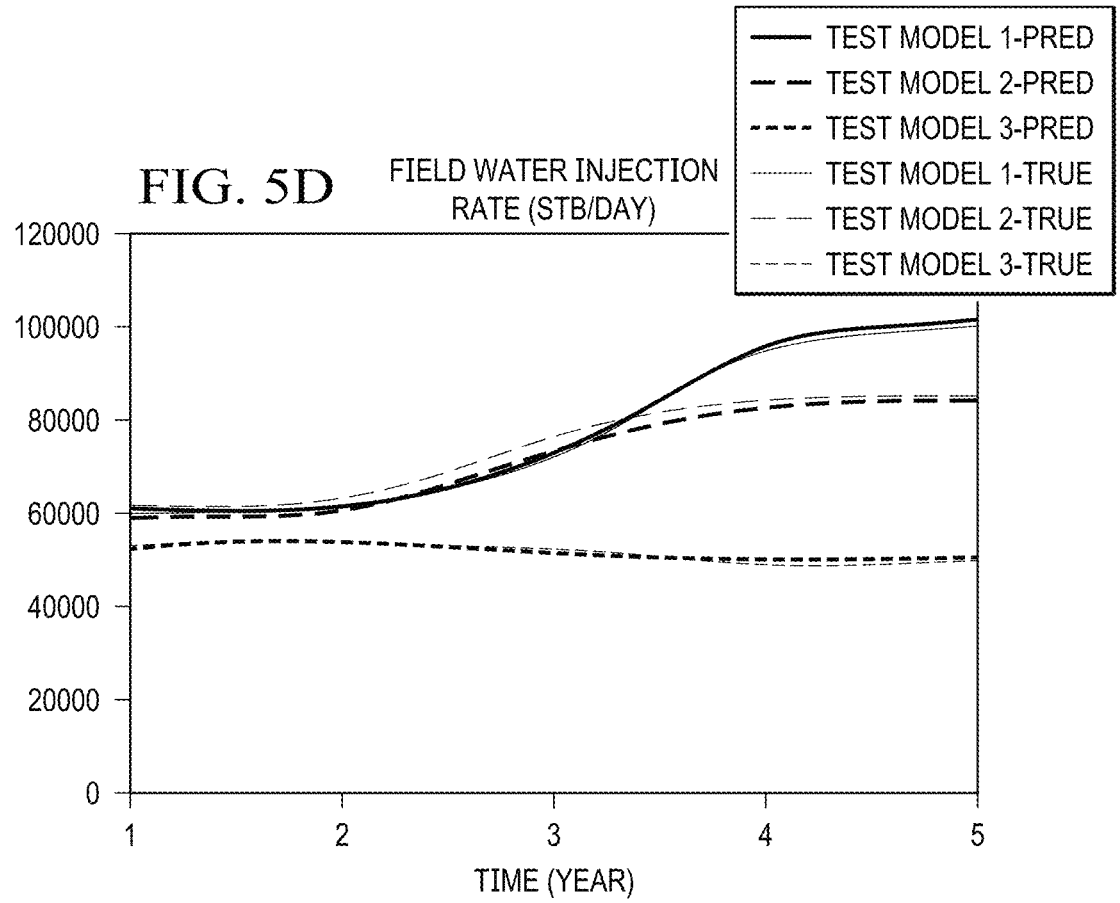

In a test case, the performance of the machine learning algorithms were compared using different training data set sizes, see FIGS. 4A and 4B. The output variables 58 in this test care are water, oil, and gas production rates and field water injection rate for a period of time at different step intervals. An example of how to create a training dataset is by running a full physics flow simulator many times with varying values of reduced input parameters of permeability field, porosity field, and production and injection wells' bottom hole pressure (BHP), based on Latin hypercube sampling algorithm. For different datasets, the optimal values of the machine learning hyper-parameters (e.g. learning rate) would also change. Therefore, optimal values of hyper-parameters are obtained by performing Bayesian optimization for each testcase.

The machine learning algorithm XGB produces a relatively high and consistent accuracy, even for a smaller dataset size. Using ANN approach, the accuracy gradually surpasses that of XGB when size of the dataset increases. When the simulation problem is cheaper to evaluate, the ANN approach is preferred, since a higher accuracy can be obtained by using a larger dataset. However, when the simulation is more expensive and the budget to generate the dataset is limited, XGB is a more practical approach that ensures a better accuracy. Regardless, it should be understood that ANN and XGB both yield superior performances compared to MVR. From FIG. 4B, the mean square errors (MSE) remains much higher even with a large dataset for the MVR case, which implies that the method may not be able to capture more complex relationships as ANN and XGB. The algorithmic proxy model with the best performance is when using ANN and all the data, n=5000 samples. In FIGS. 5A-5D, illustrated are predicted production curves generated using the flow simulator module 48 while using ANN, test model 1-pred, test model 2-pred, and test model 3-pred, versus actual production curves from simulation of a full physics flow model, test model 1-true, test model 2-true, and test model 3-true. The flow simulator module 48 is able to replicate the curve sufficiently well for all cases.

Figure 6:
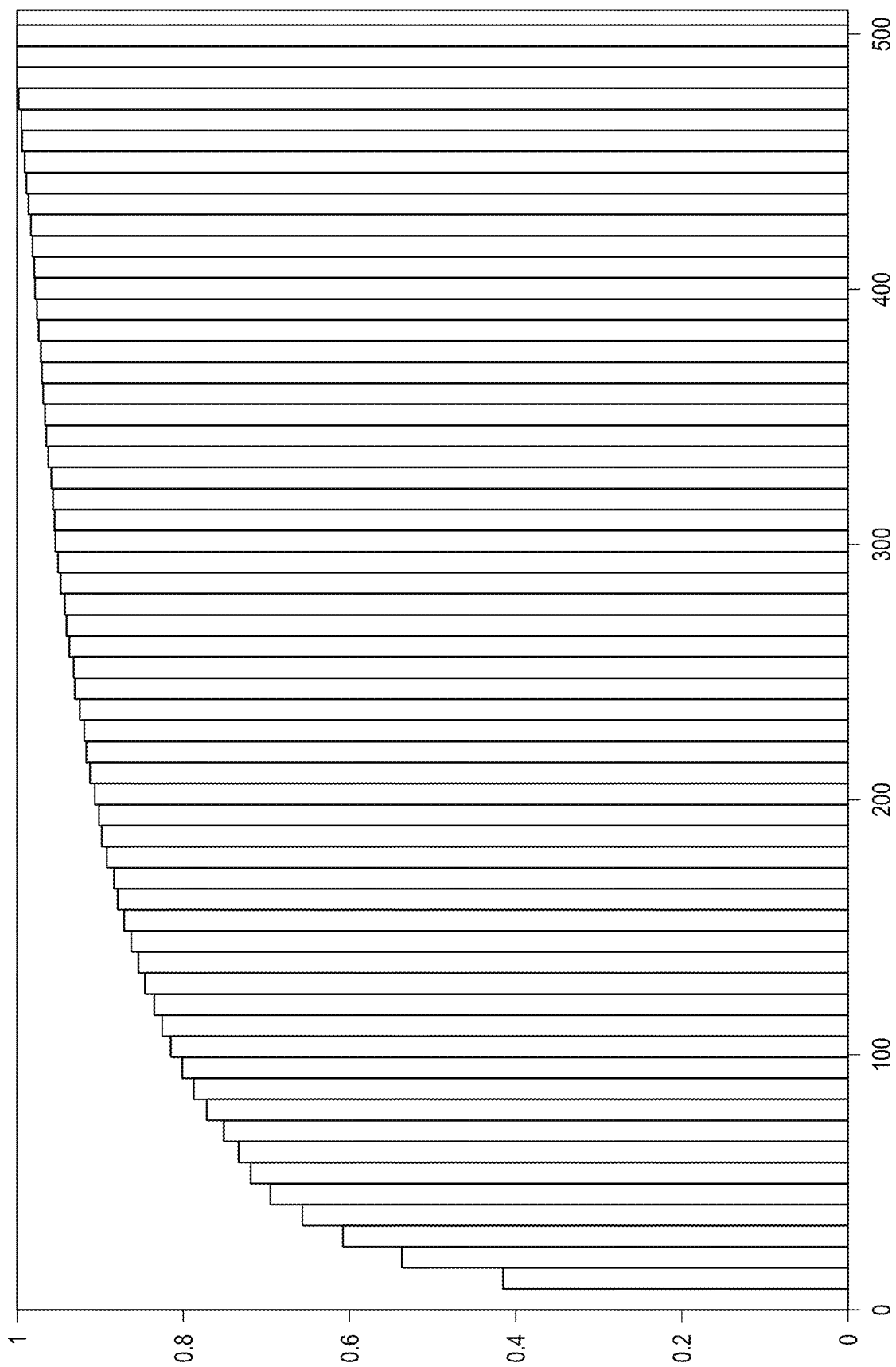
FIG. 6 is an illustration of a plot diagram for cumulative variance versus eigenvectors of two dimensional permeability field, in accordance with certain example embodiments.

FIG. 6 shows eigenvalue contributions when permeability field is decomposed by Karhunen-Loève expansion. The chart shows that in order to preserve 80% of the permeability field accuracy (spatial variability), about 100 values of the decomposed permeability field are needed to be kept, which is 25 times less than a total number of the original permeability values being at about 2,500 values. It is obvious that KLE effectively reduces the parameter space required for the next steps in the proposed closed loop reservoir characterization workflow.

Figure 7:
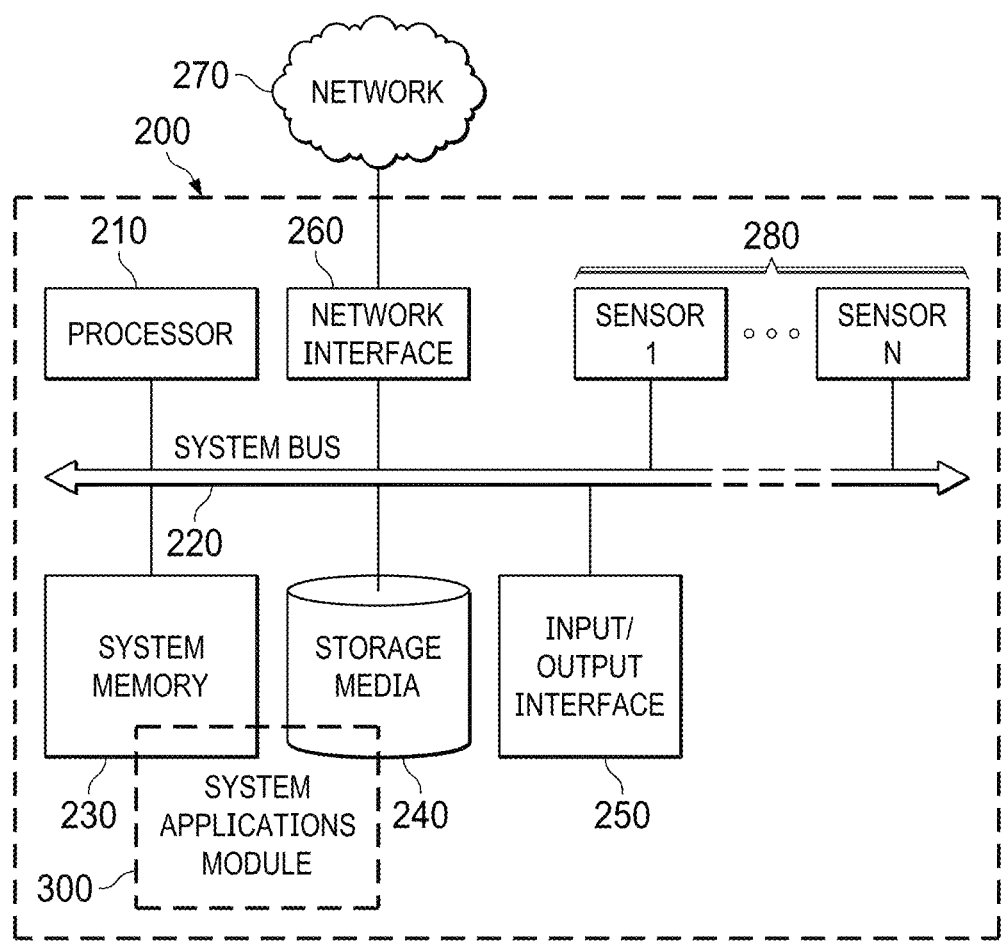
FIG. 7 is an illustration of a diagram of a computing machine and a system applications module 300, in accordance with certain example embodiments.

Referring now to FIG. 7, illustrated is a computing machine 200 and a system applications module 300, in accordance with example embodiments. The computing machine 300 can correspond to any of the various computers, mobile devices, laptop computers, servers, embedded systems, or computing systems presented herein. The module 300 can comprise one or more hardware or software elements designed to facilitate the computing machine 200 in performing the various methods and processing functions presented herein. The computing machine 200 can include various internal or attached components such as a processor 210, system bus 220, system memory 230, storage media 240, input/output interface 250, a network interface 260 for communicating with a network 270, e.g. a loopback, local network, wide-area network, cellular/GPS, Bluetooth, WIFI, and WIMAX, and sensors 280.

The computing machine 200 can be implemented as a conventional computer system, an embedded controller, a laptop, a server, a mobile device, a smartphone, a wearable computer, a customized machine, any other hardware platform, or any combination or multiplicity thereof. The computing machine 200 and associated logic and modules can be a distributed system configured to function using multiple computing machines interconnected via a data network and/or bus system.

The processor 210 can be designed to execute code instructions in order to perform the operations and functionality described herein, manage request flow and address mappings, and to perform calculations and generate commands. The processor 210 can be configured to monitor and control the operation of the components in the computing machines. The processor 210 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 210 can be a single processing unit, multiple processing units, a single processing core, multiple processing cores, special purpose processing cores, co-processors, or any combination thereof. According to certain embodiments, the processor 210 along with other components of the computing machine 200 can be a software based or hardware based virtualized computing machine executing within one or more other computing machines.

The system memory 230 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 230 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 230. The system memory 230 can be implemented using a single memory module or multiple memory modules. While the system memory 230 is depicted as being part of the computing machine, one skilled in the art will recognize that the system memory 230 can be separate from the computing machine 200 without departing from the scope of the subject technology. It should also be appreciated that the system memory 230 can include, or operate in conjunction with, a non-volatile storage device such as the storage media 240.

The storage media 240 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 240 can store one or more operating systems, application programs and program modules, data, or any other information. The storage media 240 can be part of, or connected to, the computing machine. The storage media 240 can also be part of one or more other computing machines that are in communication with the computing machine such as servers, database servers, cloud storage, network attached storage, and so forth.

The applications module 300 can comprise one or more hardware or software elements configured to facilitate the computing machine with performing the various methods and processing functions presented herein. The applications module 300 can include one or more algorithms or sequences of instructions stored as software or firmware in association with the system memory 230, the storage media 240 or both. The storage media 240 can therefore represent examples of machine or computer readable media on which instructions or code can be stored for execution by the processor 210. Machine or computer readable media can generally refer to any medium or media used to provide instructions to the processor 210. Such machine or computer readable media associated with the applications module 300 can comprise a computer software product. It should be appreciated that a computer software product comprising the applications module 300 can also be associated with one or more processes or methods for delivering the applications module 300 to the computing machine 200 via a network, any signal-bearing medium, or any other communication or delivery technology. The applications module 300 can also comprise hardware circuits or information for configuring hardware circuits such as microcode or configuration information for an FPGA or other PLD. In one exemplary embodiment, applications module 200 can include algorithms capable of performing the functional operations described by the flow charts and computer systems presented herein.

The input/output ("I/O") interface 250 can be configured to couple to one or more external devices, to receive data from the one or more external devices, and to send data to the one or more external devices. Such external devices along with the various internal devices can also be known as peripheral devices. The I/O interface 250 can include both electrical and physical connections for coupling the various peripheral devices to the computing machine or the processor 210. The I/O interface 250 can be configured to communicate data, addresses, and control signals between the peripheral devices, the computing machine, or the processor 210. The I/O interface 250 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 250 can be configured to implement only one interface or bus technology. Alternatively, the I/O interface 250 can be configured to implement multiple interfaces or bus technologies. The I/O interface 250 can be configured as part of, all of, or to operate in conjunction with, the system bus 220. The I/O interface 250 can include one or more buffers for buffering transmissions between one or more external devices, internal devices, the computing machine, or the processor 220.

The I/O interface 220 can couple the computing machine to various input devices including mice, touch-screens, scanners, electronic digitizers, sensors, receivers, touchpads, trackballs, cameras, microphones, keyboards, any other pointing devices, or any combinations thereof. The I/O interface 220 can couple the computing machine to various output devices including video displays, speakers, printers, projectors, tactile feedback devices, automation control, robotic components, actuators, motors, fans, solenoids, valves, pumps, transmitters, signal emitters, lights, and so forth.

The computing machine 200 can operate in a networked environment using logical connections through the network interface 260 to one or more other systems or computing machines across a network. The network can include wide area networks (WAN), local area networks (LAN), intranets, the Internet, wireless access networks, wired networks, mobile networks, telephone networks, optical networks, or combinations thereof. The network can be packet switched, circuit switched, of any topology, and can use any communication protocol. Communication links within the network can involve various digital or an analog communication media such as fiber optic cables, free-space optics, waveguides, electrical conductors, wireless links, antennas, radio-frequency communications, and so forth.

The processor 210 can be connected to the other elements of the computing machine or the various peripherals discussed herein through the system bus 220. It should be appreciated that the system bus 220 can be within the processor 210, outside the processor 210, or both. According to some embodiments, any of the processors 210, the other elements of the computing machine, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, an apparatus for generating forecasts from a high-dimensional parameter data space, the apparatus comprising: a reservoir model comprising a plurality input variables, output variables, and at least one algorithmic model, wherein the input variables and output variables are generated by a flow simulator module and variables from at least one selected from a group comprising a formation and reservoir properties database and a field database; the flow simulator module generates the at least one algorithmic model and output variables using at least one selected from a group comprising a full-physics flow simulator, proxy flow simulator for assisted history matching, and a proxy flow simulator for field development optimization; and wherein the at least one selected from the group generates the at least one algorithmic model using at least one selected from a group comprising the reservoir model, history matching input variables, and optimization input variables;

Clause 2, the apparatus of clause 1, wherein the proxy flow simulator for assisted history matching generates trained algorithmic models trained using the history matching input variables, an algorithmic model generated by the full-physics flow simulator, the input variables and output variables of the reservoir model, and test data generated by the full-physics flow simulator;

Clause 3, the apparatus of clause 1, wherein the proxy flow simulator for field development optimization generates trained algorithmic models using the optimization input variables, an algorithmic model generated by the full-physics flow simulator, the input variables and output variables of the reservoir model, and test data generated by the full-physics flow simulator;

Clause 4, the apparatus of any previous clause, wherein the trained algorithmic models are generated using design of experiments;

Clause 5, the apparatus of clause 1, further comprising at least one module comprising at least one feature selected from a group comprising a model order reduction feature, an assisted history matching feature, a field development optimization feature, and an objective function definition;

Clause 6, the apparatus of clause 5, wherein the reservoir model is updated at least once by at least one selected from a group comprising the model order reduction feature and the assisted history matching feature;

Clause 7, the apparatus of clause 5, wherein the reservoir model is optimized at least once by at least one selected from a group comprising the field development optimization feature and the objective function definition;

Clause 8, the apparatus of clause 1, wherein the formation and reservoir properties database comprises and rock and fluid properties and the field database comprises field production data;

Clause 9, a system for generating forecasts from a high-dimensional parameter data space, the apparatus comprising: a reservoir model comprising a plurality input variables, output variables, and at least one algorithmic model, wherein the input variables and output variables are generated by a flow simulator module and variables from at least one selected from a group comprising a formation and reservoir properties database and a field database; the flow simulator module generates the at least one algorithmic model and output variables using at least one selected from a group comprising a full-physics flow simulator, proxy flow simulator for assisted history matching, and a proxy flow simulator for field development optimization; at least one module comprising at least one feature selected from a group comprising a model order reduction feature, an assisted history matching feature, a field development optimization feature, and an objective function definition; and wherein the at least one selected from the group generates the at least one algorithmic model using at least one selected from a group comprising the reservoir model, history matching input variables, and optimization input variables;

Clause 10, the system of clause 9, wherein the proxy flow simulator for assisted history matching generates trained algorithmic models trained using the history matching input variables, an algorithmic model generated by the full-physics flow simulator, the input variables and output variables of the reservoir model, and test data generated by the full-physics flow simulator;

Clause 11, the system of clause 9, wherein the proxy flow simulator for field development optimization generates trained algorithmic models using the optimization input variables, an algorithmic model generated by the full-physics flow simulator, the input variables and output variables of the reservoir model, and test data generated by the full-physics flow simulator;

Clause 12, the system of any previous clause, wherein the trained algorithmic models are generated using design of experiments;

Clause 13, the system of claim 9, wherein: the model order reduction feature and the assisted history matching feature calibrate the reservoir model using variables from the field database, uncertainty input variables, sensitivity analysis, and an optimization algorithm; the field development optimization feature and the objective function definition optimize the reservoir model by using an optimization technique and an objective function to define best case scenarios for well site operations;

Clause 14, the system of clause 13, wherein the reservoir model is updated at least once by at least one selected from a group comprising the model order reduction feature and the assisted history matching feature;

Clause 15, the system of clause 13, wherein the reservoir model is optimized at least one by at least one selected from a group comprising the field development optimization feature and the objective function definition;

Clause 16, the system of clause 10, wherein the formation and reservoir properties database comprises and rock and fluid properties and the field database comprises field production data;

Clause 17, a method for generating forecasts from a high-dimensional parameter data space, the method comprising: selecting at least one from a group comprising a full-physics flow simulator, proxy flow simulator for assisted history matching, and a proxy flow simulator for field development optimization; generating a reservoir model comprising output variables and at least one algorithmic model using the at least one selected from the group, input variables from a reservoir properties database and a field database; and generating at least one updated reservoir model using at least one selected from a group comprising the at least one from the group, the reservoir model, history matching input variables, and optimization input variables;

Clause 18, the method of clause 15, further comprises using a proxy flow simulator for assisted history matching to generate trained algorithmic models trained using the history matching input variables, an algorithmic model generated by a full-physics flow simulator, the input variables and output variables of the reservoir model, and test data generated by the full-physics flow simulator.

What is claimed is:

1. An apparatus for generating forecasts from an input high-dimensional parameter data space, the apparatus comprising:
    a reservoir model that includes comprising a plurality of input variables, a plurality of output variables, and at least one algorithmic model, wherein the plurality of input variables and the plurality of output variables are generated by a flow simulator module based on variables from a formation and reservoir properties database and a field database, wherein the flow simulator module is configured to generate the at least one algorithmic model and the plurality of output variables using at least one simulator selected from a full-physics flow simulator, a proxy flow simulator for assisted history matching, and a proxy flow simulator for field development optimization; and
    a model order reduction module configured to generate a subset of the plurality of input variables having a reduced parameter space relative to the input high-dimensional parameter data space by identifying input variables within the plurality of input variables useful to approximate at least one output variable of the plurality of output variables, wherein the model order reduction module uses a function decomposition algorithm to identify the input variables within the plurality of input variables useful to approximate the at least one output variable so as to generate the subset of the plurality of input variables with a reduced number of input variables such that the subset of input variables of the plurality of input variables most effectively approximates the at least one output variable using the selected at least one simulator, and wherein the at least one selected simulator is further configured to generate the at least one algorithmic model using at least one of the variables used by the reservoir model, associated history matching input variables, and optimization input variables depending on the selection of the at least one simulator.

2. The apparatus of claim 1, wherein the flow simulator module is configured to generate the at least one algorithmic model and the plurality of output variables using at least one simulator selected from a proxy flow simulator for assisted history matching, wherein the proxy flow simulator for assisted history matching is further configured to generate trained algorithmic models trained using the history matching input variables, an algorithmic model generated by a full-physics flow simulator, the plurality of input variables and the plurality of output variables of the reservoir model, and test data generated by the full-physics flow simulator.

3. The apparatus of claim 1, wherein the flow simulator module is configured to generate the at least one algorithmic model and the plurality of output variables using at least the proxy flow simulator for field development optimization, wherein the proxy flow simulator for field development optimization is further configured to generate trained algorithmic models using the optimization input variables, an algorithmic model generated by the full-physics flow simulator, the input variables and output variables of the reservoir model, and test data generated by the full-physics flow simulator.

4. The apparatus of claim 2 or 3, wherein the trained algorithmic models are generated using design of experiments.

5. The apparatus of claim 1, further comprising an assisted history matching module configured to generate trained algorithmic models trained using the history matching input variables.

6. The apparatus of claim 5, wherein the reservoir model is updated at least once by the model order reduction module or the assisted history matching module.

7. The apparatus of claim 5, further comprising an optimization module, wherein the reservoir model is optimized at least once by an objective function definition module and a field development optimization module and generates an optimized reservoir model to identify best field development scenario and optimization input variables to construct a proxy flow model for the optimization module.

8. The apparatus of claim 1, wherein the formation and reservoir properties database and includes rock and fluid properties and the field database includes field production data.

9. A system for generating forecasts from an input high-dimensional parameter data space, the apparatus comprising:
    a reservoir model that includes a plurality of input variables, a plurality of output variables, and at least one algorithmic model, wherein the plurality of input variables and the plurality of output variables are generated by a flow simulator module based on variables from a formation and reservoir properties database and a field database, wherein the flow simulator module is configured to generate the at least one algorithmic model and the plurality of output variables using at least one simulator selected from a full-physics flow simulator, proxy flow simulator for assisted history matching, and a proxy flow simulator for field development optimization;
    a model order reduction module configured to generate a subset of the plurality of input variables having a reduced parameter space relative to the input high-dimensional parameter data space by identifying input variables within the plurality of input variables useful that can be used to approximate at least one output variable of the plurality of output variables, wherein the model order reduction module uses a function decomposition algorithm to identify the input variables within the plurality of input variables useful to approximate the at least one output variable so as to generate the subset of the plurality of input variables with a reduced number of input variables such that the subset of input variables of the plurality of input variables most effectively approximates the at least one output variable using the selected at least one simulator, and wherein the at least one simulator is further configured to generate the at least one algorithmic model using at least one of the variables used by the reservoir model, associated history matching input variables, and optimization input variables depending on the selection of the at least one simulator.

10. The system of claim 9, wherein the flow simulator module is configured to generate the at least one algorithmic model and the plurality of output variables using at least one simulator selected from a proxy flow simulator for assisted history matching, wherein the proxy flow simulator for assisted history matching is further configured to generate trained algorithmic models trained using the history matching input variables, an algorithmic model generated by a full-physics flow simulator, the plurality of input variables and the plurality of output variables of the reservoir model, and test data generated by the full-physics flow simulator.

11. The system of claim 9, wherein the flow simulator module is configured to generate the at least one algorithmic model and the plurality of output variables using at least the proxy flow simulator for field development optimization, wherein the proxy flow simulator for field development optimization is further configured to generate trained algorithmic models using the optimization input variables, an algorithmic model generated by the full-physics flow simulator, the input variables and output variables of the reservoir model, and test data generated by the full-physics flow simulator.

12. The system of claim 10 or 11, wherein the trained algorithmic models are generated using design of experiments.

13. The system of claim 9, further comprising an assisted history matching module, wherein the model order reduction module and the assisted history matching module calibrate the reservoir model using variables from the field database, uncertainty input variables, sensitivity analysis, and an optimization algorithm, wherein a field development optimization module and an objective function definition module optimize the reservoir model to define best case scenarios for well site operations.

14. The system of claim 13, wherein the reservoir model is updated at least once by the model order reduction module or the assisted history matching module.

15. The system of claim 13, further comprising an optimization module, wherein the reservoir model is optimized at least once by an objective function definition module and a field development optimization module and generates an optimized reservoir model to identify best field development scenario and optimization input variables to construct a proxy flow model for the optimization module.

16. The system of claim 10, wherein the formation and reservoir properties database includes rock and fluid properties and the field database includes field production data.

17. A method for generating forecasts from an input high-dimensional parameter data space, the method comprising:

selecting at least one simulator from a full-physics flow simulator, proxy flow simulator for assisted history matching, and a proxy flow simulator for field development optimization;

generating a reservoir model that includes a plurality of output variables and at least one algorithmic model using the at least one selected simulator, and a plurality of input variables from a reservoir properties database and a field database;

generating at least one updated reservoir model using at least one the variables used by the reservoir model, history matching input variables, and optimization input variables; and identifying input variables within the plurality of input variables for use in approximating at least one output variable by-applying a function decomposition algorithm so as to generate a subset of the plurality of input variables with a reduced number of input variables such that the subset of input variables of the plurality of input variables most effectively approximates the at least one output variable using the selected at least one simulator, wherein the at least one simulator is further configured to generate the at least one algorithmic model using at least one of the variables used by the reservoir model, associated history matching input variables, and optimization input variables depending on the selection of the at least one simulator.

18. The method of claim 17, further comprising using a proxy flow simulator for assisted history matching to generate trained algorithmic models trained using the history matching input variables, an algorithmic model generated by a full-physics flow simulator, the input variables and output variables of the reservoir model, and test data generated by the full-physics flow simulator.

* * * * *